United States Patent [19]

Dhami

[11] 3,995,091
[45] Nov. 30, 1976

[54] WIRE COATED WITH A FLUOROCARBON POLYMER CROSS-LINKED WITH ESTERS OF SULFONYL DIBENZOIC ACID

[75] Inventor: Kewal Singh Dhami, Shrewsbury, Mass.

[73] Assignee: International Telephone and Telegraph Corporation, New York, N.Y.

[22] Filed: Feb. 3, 1976

[21] Appl. No.: 654,893

Related U.S. Application Data

[62] Division of Ser. No. 528,019, Nov. 29, 1974.

[52] U.S. Cl. .............................. 428/379; 428/375; 428/421; 428/422
[51] Int. Cl.² .............. B32B 15/00; C08F 214/18; D02G 3/00
[58] Field of Search .......... 428/375, 379, 380, 421, 428/422; 260/79.3 R, 79.3 MU, 470, 87.5 A, 87.5 B, 79.3 M; 427/44

[56] References Cited
UNITED STATES PATENTS

| 2,427,640 | 9/1947 | Whitehill et al. ........... 260/79.3 MU |
| 2,895,842 | 7/1959 | Caldwell et al. ..................... 260/470 |
| 3,318,850 | 5/1967 | Stilmar ............................... 428/422 |
| 3,840,619 | 10/1974 | Aronoff et al. .................. 260/87.5 B |
| 3,911,192 | 10/1975 | Aronoff et al. ..................... 428/379 |

*Primary Examiner*—Lorraine T. Kendell
*Attorney, Agent, or Firm*—J. B. Raden; H. J. Holt

[57] ABSTRACT

Esters of sulfonyl dibenzoic acid of the formula

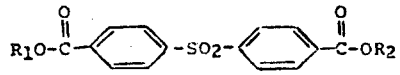

in which $R_1$ and $R_2$ are selected from the group consisting of allyl and methallyl. The compounds are useful as additives to accelerate the crosslinking of polymeric materials.

1 Claim, No Drawings

WIRE COATED WITH A FLUOROCARBON POLYMER CROSS-LINKED WITH ESTERS OF SULFONYL DIBENZOIC ACID

This is a division of application Ser. No. 528,019 filed Nov. 29, 1974. This invention relates to esters of sulfonyl dibenzoic acid and to their use as crosslinking agents for polymeric compositions.

I have discovered a new class of compounds, the diallyl, dimethallyl and mixed allyl methallyl esters of 4,4'-sulfonyl dibenzoic acid. Specifically, the new compounds have the structural formula

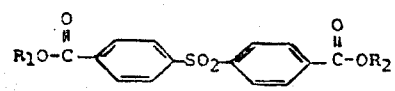

in which $R_1$ and $R_2$ are independently selected from the group consisting of allyl and methallyl radicals. These compounds have been found to act as excellent plasticising and crosslinking agents for a variety of polymeric compounds. The new compounds are particularly useful as additives for accelerating the crosslinking of high temperature processing fluorocarbon polymers, that is polymers which are extruded, or in certain instances, molded at temperatures above 260° C. These include, for example, polymers and copolymers of ethylene-tetrafluoroethylene, ethylene-chlorotrifluoroethylene, vinylidene fluoride, tetrafluoroethylene-vinylidene fluoride, tetrafluoroethylenehexafluoropropylene, vinylidene floride-hexafluorpropylenetetrafluoroethylene and the like. The new compounds have been found to improve the elevated temperature mechanical properties of the crosslinked polymers. They also act as plasticizing agents for the polymers prior to crosslinking. Further, polymers containing the compounds have been successfully extruded onto wire.

The new compounds may be produced by reacting the sulfonyl dibenzoic acid with thionyl chloride to produce the corresponding diacyl chloride. The diacyl chloride is reacted with allyl alcohol, methallyl alcohol or a mixture of allyl and methallyl alcohol. The 4,4'-sulfonyl dibenzoic acid starting material is a known, commercially available compound, described for example in Beilstein: Handbuck des Organische Chemie, 10, pg. 186. Alternatively, these new compounds can be prepared by other methods including direct esterification, catalyzed esterification or interchange esterification from saturated esters of the sulfonyl dibenzoic acid. Additionally, the compounds can be produced from the sulfonyl dibenzoic acid dinitrile or dialdehyde or like intermediates by known techniques.

The diallyl or dimethallyl esters of the invention may be used alone, or in combination with other polyfunctional crosslinking additives. Among such additives useful in combination are the diallylic and dimethallylic esters of phenyl indan as shown in U.S. Pat. No. 3,763,222. A number of other polyfunctional crosslinking additives, useful in combination with the present esters, are disclosed in application Ser. No. 402,302 filed Oct. 1, 1973. Examples of the latter are diallyl brassylate, triallyl trimesate, triallyl trimellitate and triallyl isocyanurate. Others will occur to those skilled in the art.

The crosslinking compound or compounds are added in amounts sufficient to plasticize the polymer or polymer blends for processing and to impart deformation resistance upon cross-linking. This amount may range from 0.5 to 20 parts by weight per 100 parts by weight of polymer, but will normally be from 1 to 10 parts of the crosslinker per 100 parts of polymer. The polymer or polymers and crosslinking compounds are blended, processed in the melt at an elevated temperature for a period of time sufficient to melt process, but insufficient to crosslink. The formed mixture is then cooled to ambient temperature and irradiated at a dosage between, for example, about 5 and 20 megarads.

The following examples illustrate the practice of the invention. Unless otherwise indicated, all parts are by weight.

EXAMPLE 1

This example illustrates the preparation of diallyl 4,4'-sulfonyl dibenzoate. To a suitable reaction vessel equipped with a thermometer and reflux condenser was charged 200 grams (0.65 mole) of 4,4'-sulfonyl dibenzoic acid, 189 ml. (2.61 moles) of thionyl chloride and 5 ml. of dimethylformamide (DMF). The so charged mass was heated carefully until solution occurred and then refluxed overnight. Excess thionyl chloride was distilled, first at atmospheric pressure and finally at the aspirator. Then, 134 ml. (1.96 moles) of allyl alcohol were added during a period of 3 hours and the reaction mixture was heated under reflux for another 2 hours. Most of the excess allyl alcohol was stripped and the residual molten mass slurried twice with dilute sodium carbonate solution and finally with water. After collection and air drying on a Buchner funnel, the solid product was crystallized from ethanol acetone (80:20) to afford white crystalline material in 85% yield. The material was characterized by infrared spectroscopy as the diallyl ester of 4,4'-sulfonyl dibenzoic acid, M.P. 137° C (at a 5° C/minute differential scanning calorimeter rate).

EXAMPLE 2

This example illustrates the preparation of dimethallyl 4,4'-sulfonyl dibenzoate. Employing the procedure of Example 1, 100 grams (0.33 mole) of 4,4'-sulfonyl dibenzoic acid, 95 ml. (1.31 moles) of thionyl chloride and 3 ml of dimethyl formamide were refluxed with exclusion of moisture for eight hours. Excess thionyl chloride was removed at atmospheric pressure and finally under aspirator vacuum. Then, 110 ml (1.31 moles) of methallyl alcohol were added to the resulting diacyl chloride and after reflux for three hours, the mixture was poured into a dilute solution of sodium carbonate in water. Crystallization of the crude material from acetone furnished oyster-white product in 53% yield. The product was characterized by infrared spectroscopy as the dimethallyl ester of 4,4'-sulfonyl dibenzoic acid, M.P. 157° C (at a 5° C/minute differential scanning calorimeter rate).

The diallyl ester compounds possess solubility or plasticizing properties which render them compatible with a variety of polymeric systems. For example, certain of the fluorocarbon polymers are known to exhibit unusually high chemical resistance and tend to reject plasticizer or solvent which is incorporated therein. The compounds of the invention are compatible with these fluorinated polymers in spite of the known high resistance of these polymers to solvation and swelling. The diallyl esters, when incorporated in these polymers, permit extrusion at considerably lower temperature profiles.

Table I shows the decrease in torque values achieved by the incorporation of five parts of diallyl 4,4′-sulfonyl dibenzoate in 100 parts of various fluorocarbon polymers as compared with the same polymers without additive.

TABLE I

| Polymer | Additive (Parts) | Mixing Chamber Temp. (° C) | Torque (Meter-grams) |
|---|---|---|---|
| E/TFE[1] | None | 288 | 09850 |
| " | 5 | 288 | 750 |
| E/CTFE[2] | None | 260 | 1750 |
| " | 5 | 260 | 1700 |
| PVDF[3] | None | 288 | 1075 |
| " | 5 | 288 | 900 |

[1]Ethylene-tetrafluoroethylene copolymer.
[2]Ethylene-chlorotrifluoroethylene copolymer.
[3]Polyvinylidene fluoride homopolymer.

The torque data was obtained in "Brabender" Sigma type mixer using a 63 gram total charge, in each case employing the noted temperature at a shear rate of 80 r.p.m.

The reduction in torque values indicates that the polymeric compositions containing the diallyl ester can be processed at lower temperatures, for example, to provide continuous thin wall extrusions or at equivalent temperatures to provide thinner wall extrusions.

the following mechanical properties at room temperature (about 25° C) and at elevated temperatures.

TABLE II

| | Mechanical Properties | |
|---|---|---|
| Radiation Dose (MR) | 10 | 20 |
| At Room Temperature | | |
| Tensile Strength (psi) | 5989 | 4577 |
| Elongation (at 10″/min.) (%) | 200 | 96 |
| At 250° C | | |
| Tensile Strength (psi) | 549 | 402 |
| Elongation (at 10″/min.) (%) | 333 | 135 |
| Hot Modulus (%)* at 275° C/50 psi | 42 | 37 |
| Deformation (%) at 100° C/500 grams | No change after 1 hour under specified load. | |

*Hot Modulus indicates the % extension of a sample strip of crosslinked polymer after heating the sample above the melting temperature of the uncrosslinked polymer, applying the indicated stress to the sample and cooling to room temperature.

EXAMPLE 4

The irradiation crosslinked samples of Example 3 were aged at 260° C. Samples were tested for tensile strength and elongation after cooling to room temperature. The excellent aging qualities of the crosslinked samples are shown in Table III.

Table III

| Test | Radiation Dose (MR) | Aging Period (Days) | | | | | | |
|---|---|---|---|---|---|---|---|---|
| | | 0 | 1 | 3 | 5 | 7 | 11 | 15 |
| Tensile Strength (psi) | 10 | 5989 | 4479 | 4588 | 4113 | 4345 | 4407 | 4296 |
| Elongation (%) | 10 | 200 | 81 | 88 | 44 | 50 | 31 | 25 |
| Tensile Strength (psi) | 20 | 4577 | 4688 | 4441 | 4736 | 4341 | 4259 | 4122 |
| Elongation (%) | 20 | 96 | 100 | 60 | 50 | 44 | 19 | 6 |

The following examples illustrate the excellent mechanical and aging properties of crosslinked polymeric compositions containing the compounds of the invention.

EXAMPLE 3

A polymeric composition was prepared by powder blending 200 grams of an ethylene-tetrafluoroethylene copolymer with 10 grams of diallyl 4,4′-sulfonyl dibenzoate, produced by the process of claim 1, and 1.0 grams of magnesium oxide. The blended mixture was compression molded at 254° C and subjected to irradiation at 10 and 20 megarad doses in a 1.5 mev. electron beam accelerator to produce samples of crosslinked slabs of the polymeric composition. The samples had

EXAMPLE 5

Additional crosslinked compositions were prepared as set forth in Example 3 substituting however an ethylene-chlorotrifluoroethylene (E/CTFE) copolymer and a polyvinylidene fluoride (PVDF) homopolymer, respectively, as the polymeric component. The additive was diallyl 4,4′-sulfonyl dibenzoate. The room temperature and elevated temperature properties of the compression molded and crosslinked samples are set forth in Table IV. The elevated temperature and hot modulus results were at 250° C for E/CTFE and at 200° C for PVDF.

TABLE IV

| Composition | | Radiation Dose (MR) | Room Temperature | | Elevated Temperature | | |
|---|---|---|---|---|---|---|---|
| | | | Tensile Strength (psi) | Elongation (10″/min.) (%) | Tensile Strength (psi) | Elongation (10″/min.) (%) | Hot Modulus 50 psi |
| E/CTFE alone | | 10 | 6426 | 263 | 18 | 680 | Would not support 50 psi |
| | | 20 | 5127 | 213 | 37 | 124 | |
| E/CTFE | 100 g. | 10 | 6396 | 175 | 106 | 136 | 37 |
| Diallyl Ester | 5 g. | | | | | | |
| MgO | 1 g. | 20 | 6045 | 146 | 125 | 106 | 27 |
| PVDF alone | | 10 | 3776 | 220 | 70 | 435 | 302 |
| | | 20 | 3979 | 117 | 66 | 104 | 67 |
| PVDF | 100 g. | 10 | 5841 | 329 | 174 | 147 | 33 |
| Diallyl Ester | 5 g. | 20 | 4135 | 158 | 146 | 97 | 24 |

EXAMPLE 6

The samples of Example 5 were aged at elevated temperatures after irradiation crosslinking and tested for tensile strength (psi) and elongation (%) after cooling to room temperature. The E/CTFE copolymer was aged at 225° C and the PVDF homopolymer at 200° C. The results are set forth in Table V.

| Composition | Temperature (° C) Barrel Zones | | | | |
|---|---|---|---|---|---|
| | 1 | 2 | 3 | Die | Head |
| 1 | 304 | 316 | 316 | 354 | 377 |
| 2 | 266 | 282 | 293 | 329 | 357 |
| 3 | 271 | 282 | 293 | 329 | 357 |

TABLE V

| Composition | | Radiation Dose (MR) | Aging Period (Days) | | | | | | | | | | |
|---|---|---|---|---|---|---|---|---|---|---|---|---|---|
| | | | 0 | | 1 | | 3 | | 5 | | 7 | | 11 | |
| | | | T.S. | Elong. | T.S. | Elong. | T.S. | Elong. | T.S. | Elong. | T.S. | Elong. | T.S. | Elong. |
| E/CTFE alone | | 10 | 6426 | 263 | 5972 | 229 | 5003 | 194 | 4632 | 171 | 4620 | 113 | 4143 | 58 |
| | | 20 | 5127 | 213 | 5382 | 192 | 4958 | 167 | 4882 | 121 | 4560 | 96 | 4602 | 54 |
| E/CTFE     100g | | 10 | 6396 | 175 | 5846 | 158 | 5107 | 117 | 5067 | 127 | 5048 | 117 | 4729 | 100 |
| Diallyl Ester   5g | | | | | | | | | | | | | | |
| MgO             1g | | 20 | 6045 | 146 | 5118 | 96 | 4736 | 88 | 5141 | 88 | 3429 | 183 | 4786 | 500 |
| PVDF alone | | 10 | 3776 | 220 | 4108 | 417 | 3782 | 267 | 3663 | 269 | 3548 | 158 | 4024 | 329 |
| | | 20 | 3779 | 117 | 3270 | 113 | 3466 | 118 | 3436 | 75 | 4745 | 58 | 3528 | 58 |
| PVDF     100g | | 10 | 5841 | 329 | 4098 | 300 | 4941 | 267 | 4464 | 267 | 3955 | 146 | 4528 | 275 |
| Diallyl Ester   5g | | 20 | 4135 | 158 | 4225 | 192 | 3737 | 71 | 3896 | 71 | 3755 | 96 | 4004 | 46 |

Three additional samples were prepared by powder blending as set forth in Example 3. The three compositions were:

| | | | |
|---|---|---|---|
| 1 - | E/TFE copolymer alone. | | |
| 2 - | E/TFE copolymer | 100 | gms. |
| | MgO | 0.5 | gms. |
| | Diallyl 4,4'-sulfonyl dibenzoate | 5 | gms. |
| | Irganox 1010* (antioxidant) | 0.25 | gms. |

*Irganox 1010 is tetrakis (methylene 3-(3', 5'-di-tert-butyl-4'-hydroxyphenyl) propionate) methane

| | | | |
|---|---|---|---|
| 3 - | E/TFE copolymer | 100 | gms. |
| | MgO | 0.5 | gms. |
| | Diallyl 4,4'-sulfonyl dibenzoate | 3 | gms. |
| | Triallyl trimesate | 2 | gms. |
| | Irganox 1010 | 0.25 | gms. |

The three samples in powdered form were extruded through an extruder head having a head temperature of 277° C to form rods. The rods were then pelletized and the pellets were extruded onto the surface of an 18 AWG bare copper wire to form a 10 to 15 mil coating. The extrusion conditions were as follows:

The insulated wires were then subjected to irradiation with high energy electrons by a 1.0 mev. resonant beam transformer. The resulting insulated wires with irradiation crosslinked coatings were then annealed and subsequently tested to determine their mechanical and electrical properties. The results of these tests on the wire samples are set forth in Table VI.

TABLE VI

| Test | COMPOSITION OF WIRE COATING | | | | | |
|---|---|---|---|---|---|---|
| | 1 (No additive) | | 2 (With diallyl ester) | | 3 (With diallyl and triallyl ester) | |
| | 10MR | 20MR | 10MR | 20MR | 10MR | 20MR |
| Room Temperature Tensile Strength (psi) | 5229 | 5480 | 6603 | 6832 | 5651 | 5864 |
| Elongation (%) | 133 | 170 | 225 | 225 | 119 | 108 |
| At 250° C Tensile Strength (psi) | 340 | 290 | 471 | 567 | 321 | 351 |
| Elongation (%) | 700 | 395 | 338 | 455 | 133 | 78 |
| Hot Modulus (275° C/50 psi) | Failed | 280 | 83 | 65 | 86 | 29 |
| High Voltage Cut-thru (at 250° C one lb. load on each end and 900 V(rms)) | Failed | Failed | Passes at 200° C, 1 ½ lb. load on each end (10 mils insulation thickness) | | Passes at 250° C, 1 lb. load on each end (15 mils insulation thickness) | |

Table VI indicates that both room temperature and elevated temperature properties of irradiation cured wire coatings, containing the diallyl esters of the invention, were in most cases better, and in some cases considerably better, than the equivalent coatings without the esters. High voltage cut-through properties were especially outstanding, particularly in the case of composition 3 containing the diallyl ester in combination with a trifunctional crosslinking agent.

I claim:

1. Wire coated with an irradiation cured polymeric composition comprising a high temperature processing fluorocarbon polymer selected from the group consisting of polymers and copolymers of ethylene-tetrafluoroethylene, ethylene-chlorotrifuloroethylene, vinylidene fluoride, tetrafluoroethylene-vinylidene fluoride, tetrafluoroethylene-hexafluoropropylene, vinylidene fluoride-hexafluoropropylene-tetrafluoroethylene and blends thereof and as a crosslinking agent a compound of the formula:

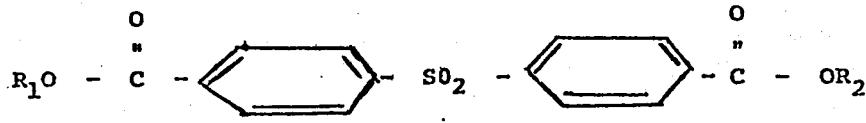

in which $R_1$ and $R_2$ are independently selected from the group consisting of allyl and methallyl, the crosslinking agent being present in an amount of from 0.5 to 20 parts by weight per hundred parts of the fluorocarbon polymer sufficient to plasticize the polymer and to impart deformation resistance upon cross-linking.

* * * * *